(12) United States Patent
Anderson et al.

(10) Patent No.: US 10,891,568 B2
(45) Date of Patent: *Jan. 12, 2021

(54) LEADER DIRECTED COORDINATION OF NAVIGATION FOR A GROUP TRAVELING TOGETHER IN A TRANSPORTATION HUB

(71) Applicant: INTERNATIONAL BUSINESS MACHINES CORPORATION, Armonk, NY (US)

(72) Inventors: Evelyn R. Anderson, Houston, TX (US); Michael Bender, Rye Brook, NY (US); Rhonda L. Childress, Austin, TX (US); Ea-Ee Jan, Adrsley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,355

(22) Filed: Apr. 16, 2019

(65) Prior Publication Data
US 2019/0244157 A1 Aug. 8, 2019

Related U.S. Application Data

(63) Continuation of application No. 15/593,774, filed on May 12, 2017, now Pat. No. 10,346,773.

(51) Int. Cl.
*G06Q 10/06* (2012.01)
*G06Q 50/30* (2012.01)
(Continued)

(52) U.S. Cl.
CPC ..... *G06Q 10/063116* (2013.01); *G06Q 50/01* (2013.01); *G06Q 50/30* (2013.01); *H04W 4/02* (2013.01)

(58) Field of Classification Search
CPC .......... G06Q 10/063116; G06Q 50/30; G06Q 50/01; G06Q 10/047; H04Q 4/02
See application file for complete search history.

(56) References Cited

U.S. PATENT DOCUMENTS 6,209,026 B1 * 3/2001 Ran ..................... G06Q 10/047
702/3
6,424,910 B1 7/2002 Ohler et al.
(Continued)

OTHER PUBLICATIONS

TripIt and TripIt Pro—On the Web and the iPhone TripIt, Apr. 23, 2013 (Year: 2013).*
(Continued)

*Primary Examiner* — Scott L Jarrett
(74) *Attorney, Agent, or Firm* — Schmeiser, Olsen & Watts, LLP; Nicholas L Cadmus (57) ABSTRACT

A method and system to assist people traveling together through a transport hub. Access to personal data is provided for members of a group of people traveling together through the transport hub for a trip. A preferred route is mapped, from a current location of the group, for each person to travel through the transport hub. A group route, which is route to be commonly used by each person of the group, is selected. Sub-groups of members are selected to travel through the transport hub together in response to matching personal data. The personal data, travel data for the group, and transport hub data corresponding to the transport hub are monitored. Each person is alerted, in response to the monitored values, to begin moving from the current location towards a departure location along the selected group route to arrive at the departure location at a desired arrival time.

20 Claims, 5 Drawing Sheets

(51) Int. Cl.
*H04W 4/02* (2018.01)
*G06Q 50/00* (2012.01)

(56) References Cited

U.S. PATENT DOCUMENTS

| | | | |
|---|---|---|---|
| 6,510,379 B1* | 1/2003 | Hasegawa | G01C 21/20 340/988 |
| 6,759,972 B2 | 7/2004 | Gupta et al. | |
| 6,837,827 B1 | 1/2005 | Lee et al. | |
| 7,136,747 B2 | 11/2006 | Raney | |
| 7,707,256 B2 | 4/2010 | Rollin et al. | |
| 7,917,866 B1 | 3/2011 | Karam | |
| 7,920,968 B2 | 4/2011 | Chapin et al. | |
| 7,921,022 B2* | 4/2011 | de Marcken | G01C 21/3438 705/5 |
| 7,970,666 B1 | 6/2011 | Handel | |
| 8,005,696 B2* | 8/2011 | de Marcken | G06Q 10/025 705/6 |
| 8,073,614 B2* | 12/2011 | Coughlin | G01C 21/20 701/465 |
| 8,155,669 B2 | 4/2012 | Ziskind et al. | |
| 8,165,799 B2 | 4/2012 | Snavely et al. | |
| 8,185,418 B2 | 5/2012 | de Marcken et al. | |
| 8,284,748 B2 | 10/2012 | Borghei | |
| 8,306,835 B2 | 11/2012 | De Marcken et al. | |
| 8,340,904 B2 | 12/2012 | Lin | |
| 8,498,810 B2 | 7/2013 | Mayer et al. | |
| 8,577,589 B2 | 11/2013 | Shin et al. | |
| 8,700,250 B1* | 4/2014 | Curtis | G01C 21/206 701/25 |
| 8,725,612 B2 | 5/2014 | Mundinger et al. | |
| 8,744,882 B2* | 6/2014 | Carey | G06Q 10/02 705/5 |
| 9,026,367 B2 | 5/2015 | Paek et al. | |
| 9,191,352 B2 | 11/2015 | Parmar et al. | |
| 9,204,251 B1* | 12/2015 | Mendelson | G08G 1/14 |
| 9,232,350 B2 | 1/2016 | Foy et al. | |
| 9,443,447 B2* | 9/2016 | Bailiang | G09B 29/007 |
| 9,571,988 B2 | 2/2017 | Taniguchi | |
| 9,615,204 B1 | 4/2017 | Haney | |
| 9,791,281 B2* | 10/2017 | Baughman | G06Q 50/14 |
| 10,038,980 B2* | 7/2018 | Hamahata | H04W 4/08 |
| 10,078,337 B1 | 9/2018 | Yao et al. | |
| 10,080,100 B2* | 9/2018 | Li | G06Q 50/01 |
| 10,179,719 B1* | 1/2019 | Abuelsaad | B66B 25/00 |
| 10,200,818 B2* | 2/2019 | Park | H04W 4/025 |
| 10,288,444 B2* | 5/2019 | Andrew | G01C 21/3679 |
| 10,346,773 B2* | 7/2019 | Anderson | H04W 4/02 |
| 10,356,561 B2* | 7/2019 | Moraru | H04W 84/18 |
| 10,410,310 B2* | 9/2019 | Bora | A62B 5/00 |
| 2003/0100326 A1* | 5/2003 | Grube | H04W 84/08 455/515 |
| 2003/0191584 A1* | 10/2003 | Robinson | G01C 21/3407 701/428 |
| 2004/0039579 A1 | 2/2004 | Chithambaram et al. | |
| 2005/0143096 A1* | 6/2005 | Boesch | G01S 19/14 455/456.3 |
| 2005/0222756 A1* | 10/2005 | Davis | G01C 21/3484 701/466 |
| 2006/0155591 A1 | 7/2006 | Altaf et al. | |
| 2006/0206363 A1 | 9/2006 | Gove | |
| 2006/0227047 A1 | 10/2006 | Rosenberg | |
| 2006/0265484 A1* | 11/2006 | Delia | H04L 67/18 709/223 |
| 2007/0037568 A1* | 2/2007 | Warner | G01S 5/0289 455/422.1 |
| 2007/0273514 A1 | 11/2007 | Winand et al. | |
| 2008/0096519 A1* | 4/2008 | Miegel | H04W 4/023 455/404.2 |
| 2008/0145045 A1* | 6/2008 | Chen | G03B 1/00 396/411 |
| 2008/0312819 A1* | 12/2008 | Banerjee | G06Q 10/047 701/433 |
| 2009/0005018 A1* | 1/2009 | Forstall | H04M 3/42348 455/414.1 |
| 2009/0112461 A1* | 4/2009 | Murphy | G01C 21/20 701/532 |
| 2009/0276154 A1* | 11/2009 | Subramanian | G01C 21/20 701/469 |
| 2011/0118975 A1* | 5/2011 | Chen | G01C 21/3438 701/533 |
| 2011/0284627 A1 | 11/2011 | Stefani | |
| 2012/0008526 A1* | 1/2012 | Borghei | H04W 4/022 370/254 |
| 2013/0231861 A1 | 9/2013 | Yokoyama et al. | |
| 2014/0219485 A1* | 8/2014 | Jensen | H04R 25/405 381/313 |
| 2015/0330797 A1 | 11/2015 | Shukla | |
| 2016/0203422 A1 | 7/2016 | Demarchi et al. | |
| 2017/0238129 A1 | 8/2017 | Maier | |
| 2018/0218463 A1 | 8/2018 | Jobling | |
| 2018/0330294 A1 | 11/2018 | Anderson et al. | |
| 2018/0330307 A1 | 11/2018 | Anderson et al. | |

OTHER PUBLICATIONS

Office Action (dated Nov. 5, 2018) for U.S. Appl. No. 15/593,774, filed May 12, 2017.
Eaton, Kit; Find Your Way Through the Airport Maze, Phone in Hand; The New York Times; Jul. 18, 2012.
Stellin, Susan; Yes! Download that Airline App; The New York Times, Feb. 29, 2012.
Amendment (dated Feb. 5, 2019) for U.S. Appl. No. 15/593,774, filed May 12, 2017.
Notice of Allowance (dated Mar. 1, 2019) for U.S. Appl. No. 15/593,774, filed May 12, 2017.
Office Action (dated Nov. 5, 2018) for U.S. Appl. No. 15/593,911, filed May 12, 2017.
Amendment (dated Feb. 5, 2019) for U.S. Appl. No. 15/593,911, filed May 12, 2017.
Final Office Action (dated Mar. 1, 2019) for U.S. Appl. No. 15/593,911, filed May 12, 2017.

* cited by examiner

LEADER DIRECTED COORDINATION OF NAVIGATION FOR A GROUP TRAVELING TOGETHER IN A TRANSPORTATION HUB

This application is a continuation application claiming priority to Ser. No. 15/593,774, filed May 12, 2017, now U.S. Pat. No. 10,346,773, issued Jul. 9, 2019.

TECHNICAL FIELD

The invention relates generally to a system and method for assisting a group of people traveling together through a transportation hub, and in particular to a system and method for alerting members of the group to move through the transport hub in order to arrive at a destination location on time.

BACKGROUND

A group of people traveling together through a transport hub has many options of routes, travel times and other parameters effecting their traversal throughout the transport hub and effecting their ability and likelihood of arriving at a singular destination location on time. Accordingly, there is a need for improved systems and methods to assist the members of the group in traveling throughout the transport hub.

SUMMARY

The present invention is a method and system to assist people traveling together through a transport hub from a current location to a destination location using smart portable personal computing devices which provide personal data, travel data and transport hub data. The method provides for sub-groups of traveler's having common travel preferences, and it maps routes according to those preferences for the group members to travel through the transport hub together. Continuous monitoring of values provides an alert on each sub-group member's personal computing device when the personal data, travel data, transport hub data, or predetermined parameters change.

The inventive group travel assistance method includes the steps of:

identifying, by a plurality of portable smart computing devices, a group of people traveling together through the transport hub, wherein travel data for the group includes a departure location, a boarding time, and a departure vehicle, wherein each person of the group has possession of one of the plurality of portable computing devices;

identifying, by the plurality of portable smart computing devices, transport hub data corresponding to the transport hub;

providing access, by the plurality of portable smart computing devices, to personal data for members of the group;

mapping, by each person's portable smart computing device, a preferred route from a current location via a preferred mode for each person to travel through the transport hub, wherein the preferred route is a direct route without stops or a route including one or more preferred stops;

generating, by each person's portable smart computing device, sub-groups of members to travel through the transport hub together in response to matching personal data;

monitoring, by each person's portable smart computing device, values including the personal data for members of the group, travel data for the group, transport hub data and predetermined parameters; and alerting each person, by each person's portable smart computing device, in response to the monitored values, to begin moving towards the departure location via the preferred mode along the preferred route to arrive at the departure location at a desired arrival time.

DETAILED DESCRIPTION

In the following description, specific details are set forth although it should be appreciated by one of ordinary skill that the present invention can be practiced without at least some of the details. In some instances, known features or processes are not described in detail so as not to obscure the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
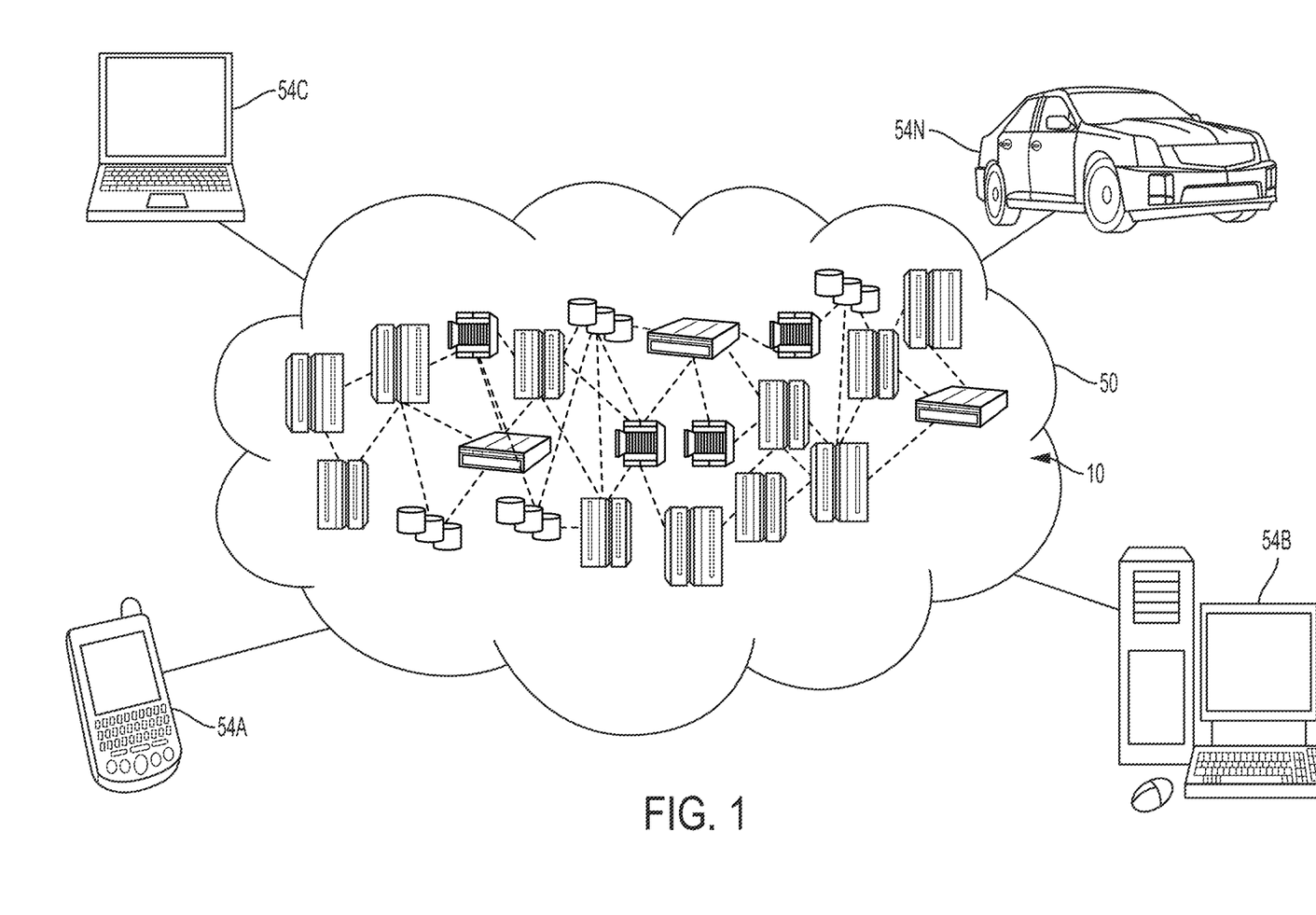
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
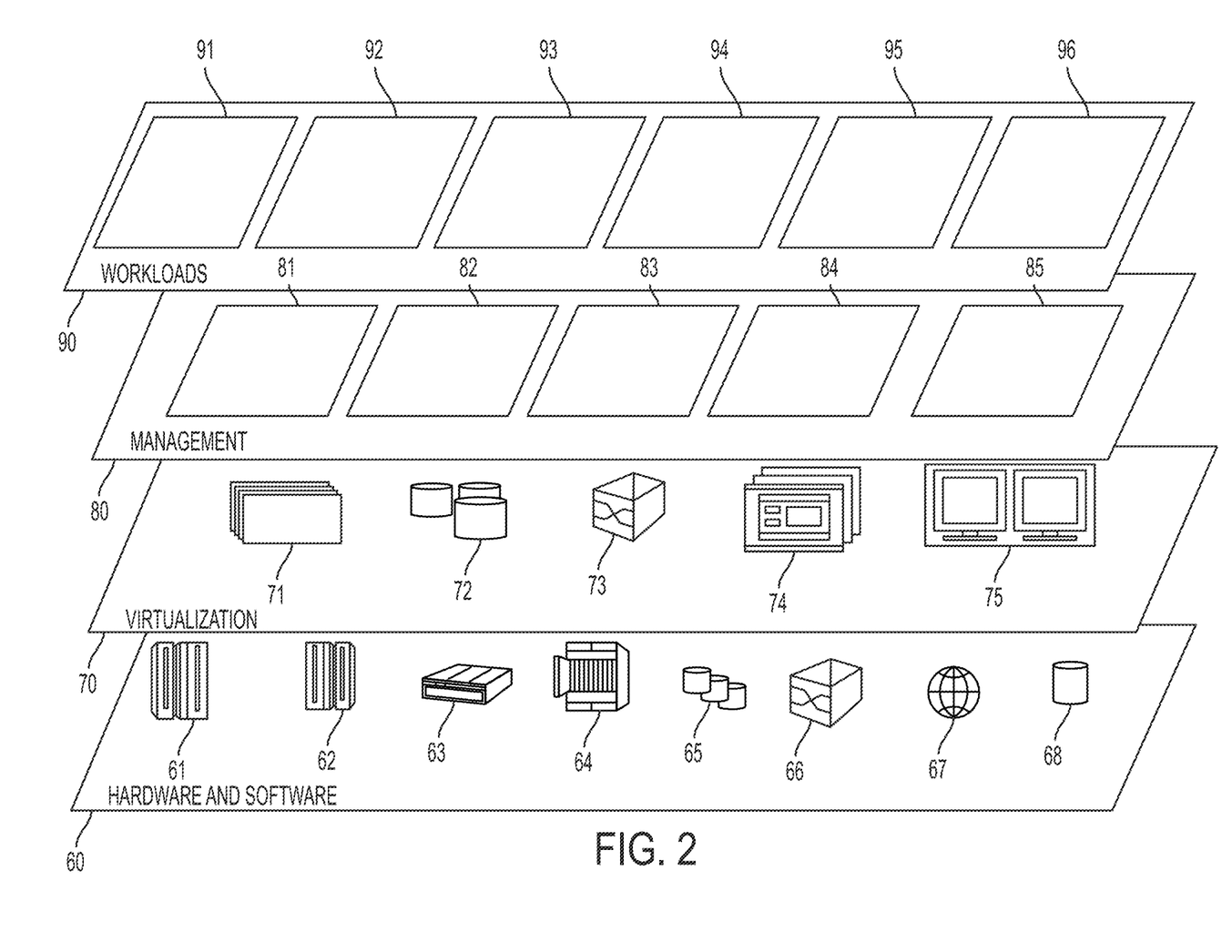
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recommending travel choices to a person traveling through a transport hub 96.

A group travel assistance system and method for assisting members of a group traveling together through a transportation hub includes a software application installed on each group traveler's smart phone or other smart portable communications device, which is in wireless communications with the respective traveler's Internet of Things IoT devices, and other network components such as computers, servers, switches, etc. which together enable the system to operate over a wireless network in a cloud computing environment. A personal IoT wireless device includes, but is not limited to, a smart watch, an activity tracker, a pedometer, a fitness tracker, a walking tracker and a personal movement sensing device. These IoT devices typically communicate with one another or with the person's smart phone using wireless communications such as bluetooth technology. A person's smart portable communications device includes, but is not limited to, devices which provide wireless communications such as a smart phone, an iPad™, a smart tablet or a laptop computer.

People traveling in a group will often encounter a transportation hub, also referred to as a transport hub or transport interchange, which is a place where passengers are exchanged between vehicles in various transport modes. Transport hubs include, but are not limited to, airports, train stations, bus stations and rapid transit stations. The group travel assistance system and method will gather and analyze each group member's personal data, the group's travel data and the pertinent transportation hub data in order to provide assistance to the members of the group traveling together through the transport hub.

When traveling through a transportation hub like an airport terminal, each passenger is required to arrive at a departure location or gate at or before a given boarding time in order to board the departure vehicle such as an airplane, which will be leaving the airport at an established departure time. The traveler's personal portable smart computing device, such as a smart phone with wireless Internet capability, includes software applications to assist the person in his travels. The traveler can also have access to numerous IoT devices which can communicate, for instance via Bluetooth communications, with one another and with the person's smart phone or other portable smart computing device.

Transport hub data can be downloaded or otherwise accessed by the person's portable smart computing device from a computing cloud via the Internet, whereby the transport hub data will include maps or layout information of the particular transportation hub. For instance, interactive airline information and airport terminal maps are available online which provide information about each terminal such as, but not limited to, arrival terminal maps, departure terminal maps, specific airline gate information, flight information, locations of shops, restaurants, lounges, banks, parking, transits, trams, boarding areas, restrooms, smoking areas, elevators, escalators, public phones, stairwells, defibrillators, mailboxes, water fountains, assisted care areas, etc.

Personal data for each member of the group is available from each individual's smart phone, or from other nearby IoT devices, or from remote storage locations/computers via the Internet and the computing cloud. Each person's personal data can include items such as, but not limited to, health data, age, height, weight, and eating preferences or requirements.

The traveler's personal data will include health data such as medical records, prescription drug data, etc. The health data can include information such as:

How far the person can walk before needing to stop to rest;

An average speed and a maximum speed at which the person can walk;

Whether the person can carry or pull his own luggage through the transport hub;

How many pieces of luggage he can carry or pull, measured for instance by the number of luggage items he can maintain, or by the weight of the luggage;

Whether the person requests help from other group members with his luggage or for other travel assistance needs;

Whether the person can walk, or if he needs a wheelchair or a motorized cart to travel through the transport hub; and Whether the person should preferably use moving walkways, elevators and escalators.

A person's personal data can also include travel preferences such as how early he likes to arrive at the boarding gate, and whether he likes to stop at a lounge, restaurant or gift shop en route to his departure location. For instance, some traveler's prefer to immediately upon arrival at the transport hub go to the boarding gate for a connecting flight, whereas other traveler's prefer to walk the airport if just for the exercise.

The travel data for the group will include the airline name, flight number, departure gate or location, departure time of the flight, and boarding time to board the flight. Each traveler's personal data, the group travel data, and the transport hub data can be accessed on the smart phones of the group members via the computing cloud/Internet.

Each person can add or change individual preferences to his personal data. The updated personal data can be stored and updated in one or more memories/databases on his smart phone, the IoT devices, or in the computing cloud or network which will store the data for the whole group to access. For instance, one person may have a personal preference to immediately go to his departure location upon arriving at the airport. Another person may have a different personal preference to typically stop at a restroom or a restaurant prior to heading to the departure gate location. Still another person may prefer to go to a cocktail lounge to relax and have a drink.

Each group member's personal data includes information about his health, lifting ability, ability to carry or pull luggage, endurance, and ability to walk through the transport hub. This personal data must be taken into account by the group as the travelers moves through the transport hub. One person in the group may take 15 minutes to walk at a given speed from a given location (e.g. a current location such as at a restaurant) in the transport hub to a departure gate, whereas another person of the group may have to walk at a much slower speed due to health restrictions, and may require 25 minutes to make the same walk. Yet another person in the group may require a motorized transport because the distance from the restaurant to the departure gate is too far for him to walk without frequent rest stops.

In one example, a group of 15 travelers arrive at an airport terminal transport hub at various times and coming from different parking lots and locations. They will be traveling together as a group on flight #623 scheduled to leave from gate B3 (e.g. the departure location) with boarding beginning at 12:30 pm and departure at 1:00 pm. Each traveler has a group assistance travel application installed on their individual smart phones and the group has been created and named August Travelers. Each of the travelers has been listed in the group and each traveler will input his own personal data, such as name, home address, telephone number, health data, eating and travel preferences.

The system and method will analyze and compare each group member's personal data and create sub-group based on the personal data and personal preferences. For instance, one sub-group prefers to stop for Chinese food in a restaurant within the transport hub prior to going to the departure location, boarding gate for their flight. Another sub-group prefers to browse the various gift shops in the concourse of the airport terminal. One person in the restaurant sub-group requests help in his personal preference with carrying his luggage and others in the same sub-group are either prompted to help, or they may have set up their personal preferences to offer help in carrying luggage for other group members.

Each sub-group will have a different set of values including the personal data for members of the group, travel data for the group, transport hub data and predetermined parameters and alerts to be monitored. The parameters include: a distance from the current location to the departure location; an estimated travel speed of each person of each sub-group to travel from the current location to the departure location; and an estimated travel time of each person of each sub-group upon leaving the current location to arrive at the departure location at the desired arrival time. In view of each sub-group members's personal data, the group travel data, the transport hub data and the parameter data, the time and travel of the members of the sub-groups is calculated so that the group members can arrive at the departure destination in a timely manner. All of the values mentioned will be governed by the slowest group member, i.e. the group member requiring the most time to travel from the current location to the departure destination.

Each person's personal data, the group travel data, transport hub data and predetermined parameters are continuously monitored and updated by the group travel assistance application on their respective smart phones. Moreover composite data for the individuals, the main group and each sub-group is stored in one or more memories or databases resident on the smart phones, associated IoT devices, or in the computer cloud.

Each traveler's smart phone will provide an alert such as a sound or visible warning to prompt the traveler to begin his journey with his sub-group members towards the departure gate in order to arrive on time. The smart phones can also be set up to provide early warnings, such as a notification or alert that the group must leave the restaurant soon (e.g. in 10 minutes) in order to arrive on time at the departure gate. The system and method can also:

Determine the most efficient route that should be taken from the traveler's current location to the departure gate;
Determine whether the traveler should walk, take the train, use moving walkways, etc;
Determine if the traveler will have time to make additional stops while en route to the departure gate;
Determine the walking pace or speed required to arrive at the departure gate on time;
Consider the traveler's historical health and performance data to make a determination as to when to leave his current location to arrive at the departure gate on time; and
Adjust the travel time, travel speed, arrival time, etc. as monitored values may change.

Figure 3:
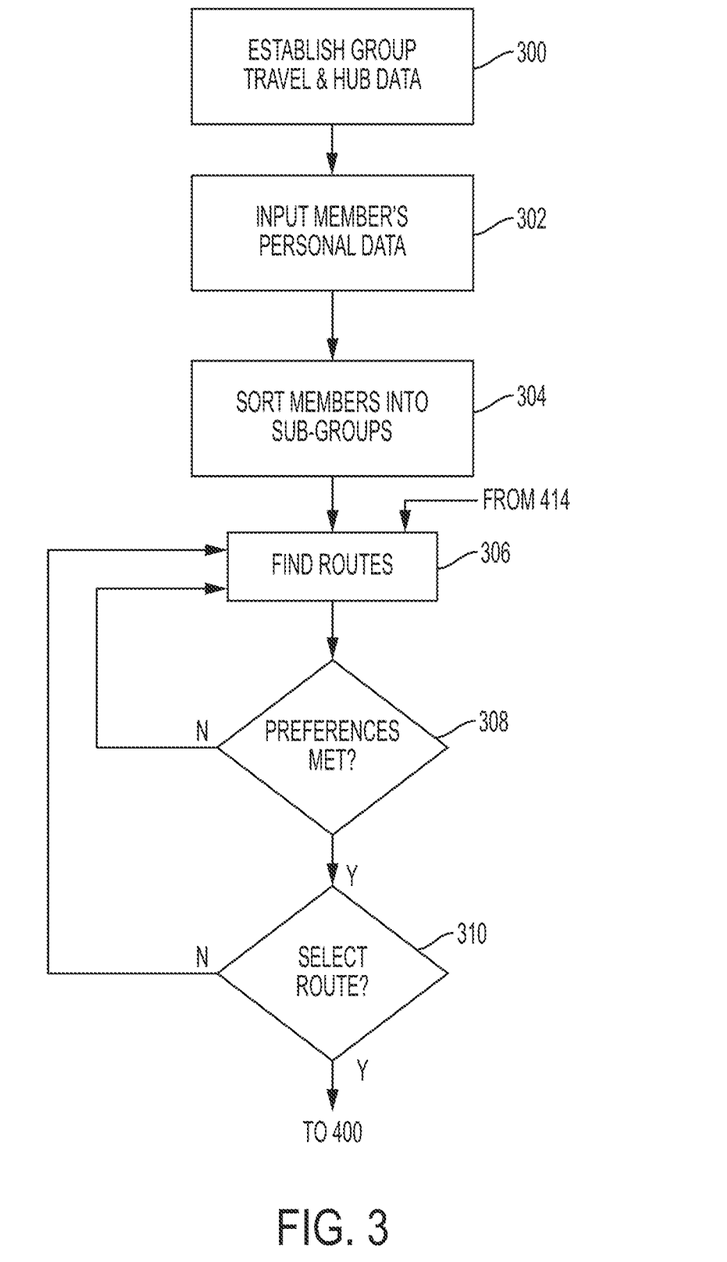
FIG. 3 is a flow chart diagram of a method for setting up a travel group and individual group member profiles in accordance with embodiments of the present invention.

FIG. 3 is a flow chart diagram of a method for setting up a travel group and individual group member profiles in accordance with embodiments of the present invention. The method is implemented as a software application installed on each traveler's personal computing device, for instance his smart phone which in turn communicates with the traveler's IoT devices via bluetooth and communicates with devices such as remote servers via a computing cloud of wireless communications (e.g. the Internet). Each traveler can initiate the method upon arriving at the transportation hub such as an airport, bus terminal or train station. Moreover, the method is performed by one or more software applications installed on each traveler's smart phone or other portable smart device.

The August Travelers group is set up in step 300 to include 15 members who each have an individual personal profile. In this example, the group is meeting at New York's LaGuardia Airport (i.e. the transport hub) in preparation for a summer trip to the mid-west. The transport hub data is accessed on-line with the smart phones, for instance using the computing cloud to access or download maps and layout information about LaGuardia airport which includes airlines, gate information, restaurant and shop information, etc. GPS positioning can be enabled for distance tracking via the smart phones.

Each group member's profile consists of personal data which is input in step 302. Based upon matching the personal and travel data, the group members are sorted into various sub-groups in step 304. The personal input data includes the traveler's preferences, such as when to arrive at the boarding gate, which route to take when walking through the terminal transportation hub and whether the traveler requires help with his luggage.

In step 306 the method uses the personal, travel and hub input data to find a route of travel for each sub-group through the transportation hub from their current location to their final destination, typically to a departure location such as a boarding gate at an airport. If the travelers sub-group preferences are not met as determined in step 308, then the input data is further analyzed to find another route in step 306. When a travel route meets the travel sub-group preferences as determined in step 308, then the route can either be automatically selected, or it can be presented to the group members on their smart phones for selection.

In one embodiment, a member of the group will be provided with administrative authority to make global changes for the group (or sub-group). The group administrator could be given authority by consensus from the group members. For instance, multiple routes which all meet the sub-groups preferences could be offered to the sub-group for traveling from the restaurant to the departure gate. A group member with administrative authority could be assigned to make the route selection. Otherwise, each sub-group member could cast a vote for a route and the route with the majority of votes would prevail. If none of the available travel routes meets each of the traveler's preferences in step 308, then the group members can be alerted on their smart phones so that they can either select one of the available routes which doesn't completely match their preferences, or they can modify the sub-group preferences and allow the method to search for routes once again. When a route is finally selected in step 310, the method continues to step 400 in FIG. 4.

In another embodiment, group decisions can be made by computer learned behavior to determine who will take the leadership position based upon decisions over time of group or sub-group members that result in a final decision for the group. For example, a travel group or sub-group consists of five members, Brian, Keith, Sarah, Britney and Juan who have made three previous trips together. For each of the three trips the personal data, the transport hub data and the group travel data has been stored in the group member's personal portable smart computing devices and/or in the computing cloud. In the first group trip, Sarah, Brian and Juan selected a first route whereas Keith and Britney selected a different second route. The final group preferred route selection was the first route. In the second group trip, Brian and Keith selected a first route, Sarah and Britney selected a second route, and Juan selected a third route. The group ultimately decided on the second route as the preferred route selection for the group. In the third group trip, Sarah, Brian, Juan and Keith selected a first route and Britney selected a second route. In this case, the first route was finally selected as the preferred route for the group. In sum, Sarah's route selections were chosen as the group selection for all three prior trips. Brian's route selection was chosen as the group selection for two of the three trips. Juan's route selection was chosen as the group selection for two of the three trips. Britney's route selection was chosen as the group selection for one of the three trips, and Keith's route selection was chosen as the group selection for one of the three trips. In view of the learned behavior from the previous three trips of the group, Sarah's route selection will be used going forward as the final group preferred route in the event of indecision. For instance, if on the fourth trip Juan and Britney want a first route, Keith and Sarah want a second route and Brian wants a third route, then the system/application will default to Sarah's route choice, i.e. the second route, as the group preferred route.

During the previous trips the preferred routes for traversing through the transport hub have most frequently followed the preferences and suggestions of Sarah. The group travel assistance application looked at the learned group behavior for this specific travel group when there was indecision or a split vote for selection of a preferred route. On the basis of the learned group behavior gleaned from the stored historical group travel data as described above, Sarah's chosen route for traveling through the transport hub was selected by the whole group as the preferred route of travel. In effect, Sarah became the administrative leader of the group. In yet another embodiment, after an administrative leader is established, for instance after a predetermined minimum number of prior trips, the route selection of the administrative leader could automatically default as the final group preferred route selection.

Figure 4:
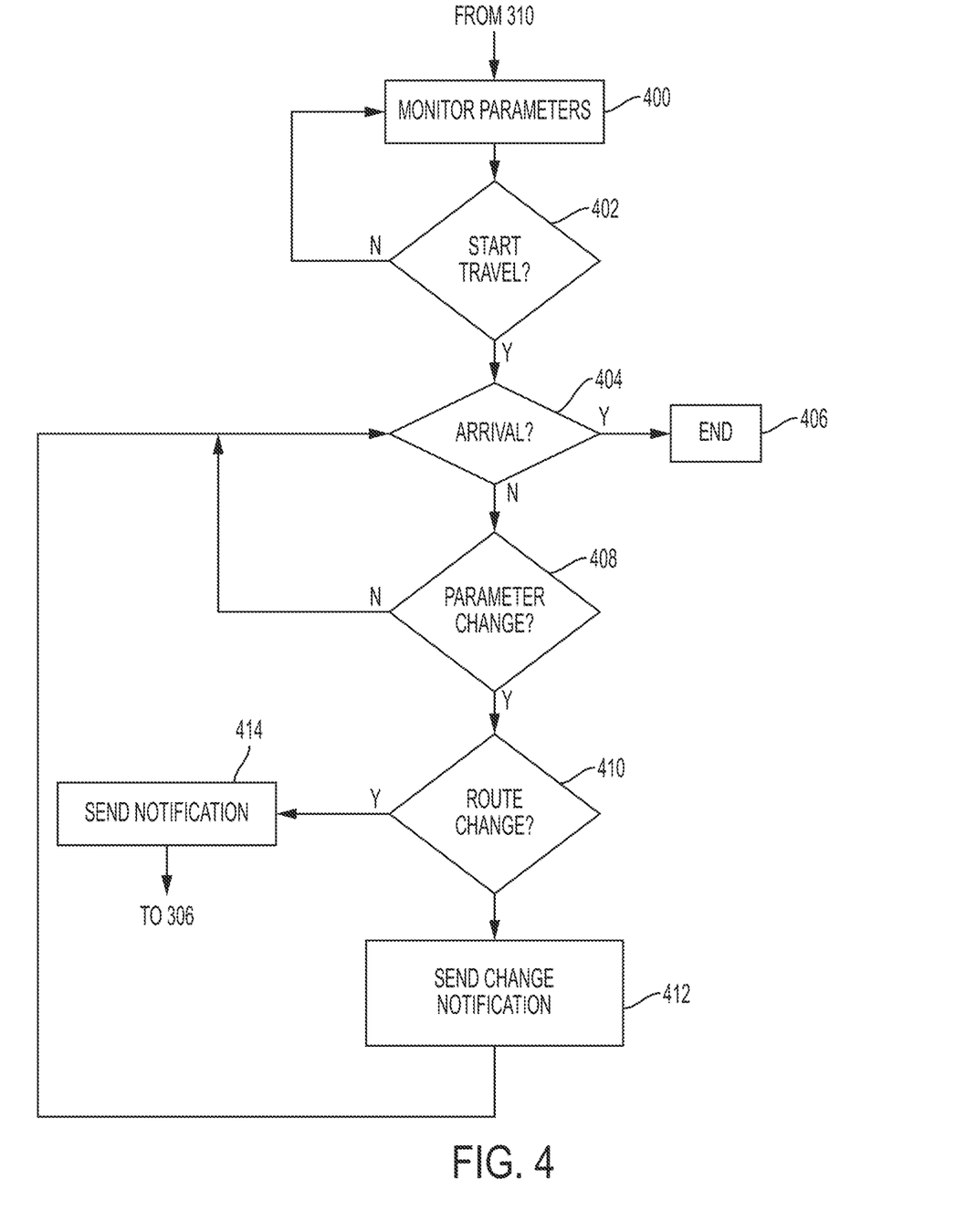
FIG. 4 is a flow chart diagram of a method for monitoring values for members of the group to travel through a transportation hub in accordance with embodiments of the present invention.

FIG. 4 is a flow chart diagram of a method for monitoring values including the personal data for members of the group, travel data for the group, transport hub data and predetermined parameters for group members to travel through a transportation hub in accordance with embodiments of the present invention. A route has been selected and personal data, group travel data, transport hub data and parameters are being continuously monitored in step 400. The parameters include the distance to travel through the transport hub, the time required to walk or otherwise travel from the current location to the destination location, as well as factors such as carrying or rolling luggage, making stops along the way, etc. The system and method will alert the travelers by audio, visual or vibration on their smart phones in step 402 when it is time to start moving towards the destination location. When they arrive at the destination departure location as determined in step 404, then the method ends in step 406.

While the group members travel through the transportation hub, the monitoring of the values including the personal data for members of the group, travel data for the group, transport hub data and predetermined parameters will continue in step 408 to determine whether any of the values have changed. For instance, a boarding time may have changed. If there are no changes, then the method continues to loop through steps 404, 408 to monitor whether the person has reached his destination, and to determine whether any values have changed. If a value change is detected in step 408, then the process continues in step 410 which determines whether the value change necessitates a route change. For instance, the flight may have been moved to a different departure gate/location. If a route change is deemed as necessary in step 410, then a notification or alert is sent to each traveler of the group or sub-group on their smart phones in step 414 and the process loops back to step 306 so that a new route can be determined and selected as previously described. If no route change is necessary in step 410, then a notification of the value change detected in step 408 is sent in step 412 to each group member's smart phone and the method loops back to step 404 to continue monitoring and determining whether the group has yet arrived at the destination location.

Figure 5:
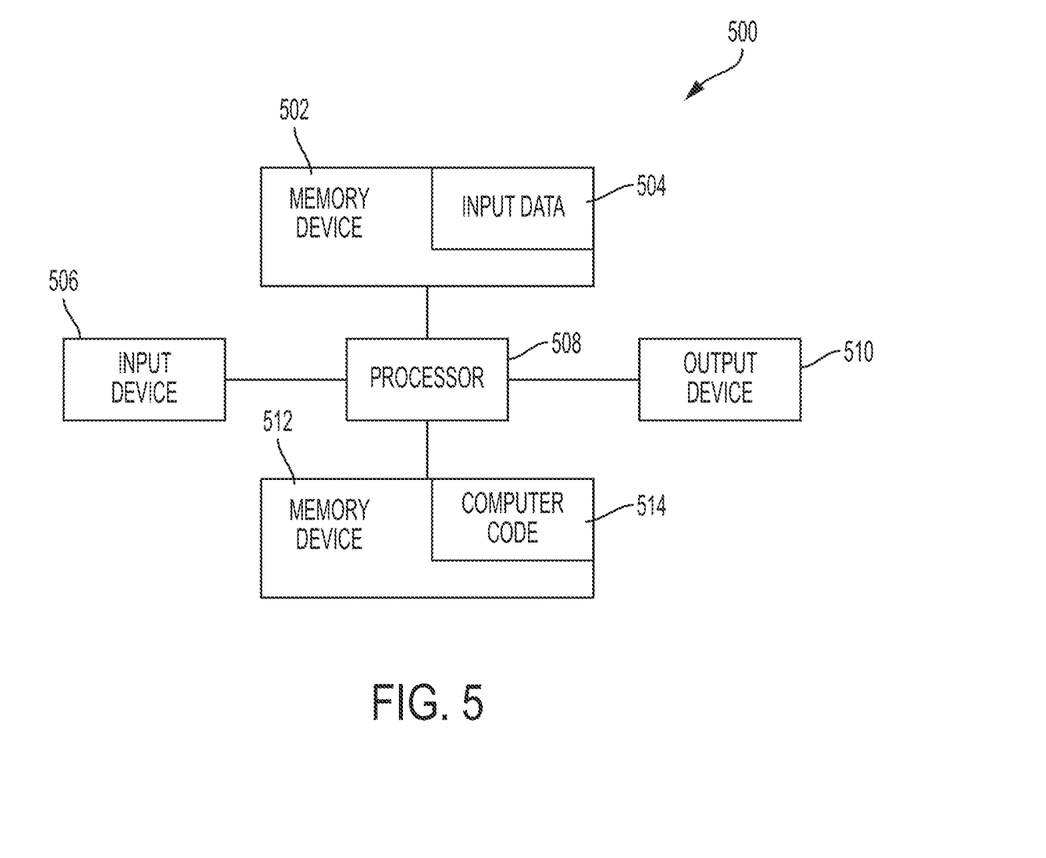
FIG. 5 illustrates an embodiment of a computer system used for implementing the methods of the present invention.

FIG. 5 is a block diagram of a computer system, aka computing device, 500 for implementing search engine optimization based upon most popular search histories in accordance with embodiments of the present invention. The computing device 500 includes a processor 508, an input device 506 coupled to the processor 508, an output device 510 coupled to the processor 508, and memory devices 502 and 512 each coupled to the processor 508. The input device 506 may be, inter alia, a keyboard, a mouse, etc. The output device 510 may be, inter alia, a printer, a plotter, a computer screen, a magnetic tape, a removable hard disk, a floppy disk, etc. The memory devices 502 and 512 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 512 includes a computer code 514 which is a computer program that includes computer-executable instructions.

The computer code 514 includes software or program instructions that may implement an algorithm for implementing methods of the present invention. The processor 508 executes the computer code 514. The memory device 502 includes input data 504. The input data 504 includes input required by the computer code 514. The output device 510 displays output from the computer code 514. Either or both memory devices 502 and 512 (or one or more additional memory devices not shown) may be used as a computer usable storage medium (or program storage device) having a computer readable program embodied therein and/or having other data stored therein, wherein the computer readable program includes the computer code 514.

Generally, a computer program product (or, alternatively, an article of manufacture) of the computer system/device 500 may include the computer usable storage medium (or said program storage device). The processor 508 may represent one or more processors. The memory device 502 and/or the memory device 512 may represent one or more computer readable hardware storage devices and/or one or more memories.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks/steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or step in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to assist people traveling together through a transport hub, said method comprising:
   providing access, by a plurality of portable smart computing devices, to personal data for members of a group of people traveling together through the transport hub for a trip, wherein each person of the group has possession of a single portable computing device of the plurality of portable computing devices;
   mapping, by each person's portable smart computing device, a preferred route from a current location at which the group is located for each person to travel through the transport hub, wherein the preferred route is a direct route without stops or a route including one or more preferred stops;
   selecting from the mapped preferred routes, by the plurality of portable computing devices, a group route which is route to be commonly used by each person of the group, wherein the selected group route is the mapped preferred route of one portable computing device of the plurality of portable computing devices, wherein each person's portable computing device mapped a preferred route for each previous trip of a plurality of previous trips by the group, and wherein said selecting the one portable computing device is based on the preferred route for the one portable computing device have been a group route for more of the previous trips than was the preferred route for any other portable computing device of the plurality of portable computing devices;
   generating, by each person's portable smart computing device, sub-groups of members to travel through the transport hub together in response to matching personal data;
   monitoring, by each person's portable smart computing device, the personal data for members of the group, travel data for the group, and transport hub data corresponding to the transport hub, wherein the travel data for the group includes a departure location, a boarding time, and a departure vehicle; and
   alerting each person, by each person's portable smart computing device, in response to the monitored values, to begin moving from the current location towards the departure location along the selected group route to arrive at the departure location at a desired arrival time.

2. The method of claim 1, wherein the personal data includes data independently selected, for each person, from the group consisting of the person's health, the person's lifting ability, the person's ability to pull or carry luggage, the person's endurance, the person's ability to walk through the transport hub, and combinations thereof.

3. The method of claim 1, wherein the transport hub data includes of maps or layout data of the transport hub.

4. The method of claim 1, wherein the monitored values include predetermined parameters, and wherein the predetermined parameters comprise:
   a distance from the current location to the departure location;
   an estimated travel speed of each person of each sub-group to travel from the current location to the departure location; and
   an estimated travel time of each person of each sub-group upon leaving the current location to arrive at the departure location at the desired arrival time.

5. The method of claim 1,
   wherein the transport hub data includes the transport hub layout; locations of departure vehicles, and locations of transporting devices within the transport hub,
   wherein said transporting devices comprise elevators, escalators, moving walkways and trams, and
   wherein the transport hub comprises an airport transport hub, a railway transport hub and a bus terminal transport hub, and wherein the departure vehicle comprises an automobile, a train, an airplane, a bus and a motorized vehicle.

6. The method of claim 1, wherein the method further comprises:
   notifying each person, by his portable smart computing device, of a change of the monitored values.

7. The method of claim 1, wherein the plurality of portable smart computing devices include wireless capabilities to access each person's personal data, the group travel data, the predetermined parameters and the transport hub data from a computer cloud or from a network.

8. The method of claim 7, wherein the plurality of portable smart computing devices communicates with respective Internet of Things IoT wireless devices of group members including smart watches, activity trackers, fitness trackers, walking trackers and personal movement sensing devices.

9. The method of claim 1, said method further comprising selecting, by the plurality of portable smart computing devices, a leader of the group or of one of the sub-groups, in response to stored computer learned behavior from previous trips of the group or sub-group, wherein the leader selects the preferred route for the group or sub-group.

10. The method of claim 9, wherein the stored computer learned behavior comprises for each previous trip: selections of routes through the transport hub by each member of the group or sub-group; and final selection of the preferred route for the group or sub-group, wherein the leader has selected a greater number of preferred routes finally selected than other members of the group or sub-group.

11. A computer program product, comprising one or more computer readable hardware storage devices having computer readable program code stored therein, said program code containing instructions executable by a computing device to implement a method to assist people traveling together through a transport hub, said method comprising:
   providing access, by a plurality of portable smart computing devices, to personal data for members of a group of people traveling together through the transport hub for a trip, wherein each person of the group has possession of a single portable computing device of the plurality of portable computing devices;
   mapping, by each person's portable smart computing device, a preferred route from a current location at which the group is located for each person to travel through the transport hub, wherein the preferred route is a direct route without stops or a route including one or more preferred stops;
   selecting from the mapped preferred routes, by the plurality ofportable computing devices, a group route which is route to be commonly used by each person of the group, wherein the selected group route is the mapped preferred route of one portable computing device of the plurality of portable computing devices, wherein each person's portable computing device mapped a preferred route for each previous trip of a plurality of previous trips by the group, and wherein said selecting the one portable computing device is based on the preferred route for the one portable computing device have been a group route for more of the previous trips than was the preferred route for any other portable computing device of the plurality of portable computing devices;

generating, by each person's portable smart computing device, sub-groups of members to travel through the transport hub together in response to matching personal data;

monitoring, by each person's portable smart computing device, the personal data for members of the group, travel data for the group, and transport hub data corresponding to the transport hub, wherein the travel data for the group includes a departure location, a boarding time, and a departure vehicle; and alerting each person, by each person's portable smart computing device, in response to the monitored values, to begin moving from the current location towards the departure location along the selected group route to arrive at the departure location at a desired arrival time.

12. The computer program product of claim 11, wherein the personal data includes data independently selected, for each person, from the group consisting of the person's health, the person's lifting ability, the person's ability to pull or carry luggage, the person's endurance, the person's ability to walk through the transport hub, and combinations thereof.

13. The computer program product of claim 11, wherein the transport hub data includes of maps or layout data of the transport hub.

14. The computer program product of claim 11, wherein the monitored values include predetermined parameters, and wherein the predetermined parameters comprise:
a distance from the current location to the departure location;
an estimated travel speed of each person of each sub-group to travel from the current location to the departure location; and
an estimated travel time of each person of each sub-group upon leaving the current location to arrive at the departure location at the desired arrival time.

15. The computer program product of claim 11,
wherein the transport hub data includes the transport hub layout; locations of departure vehicles, and locations of transporting devices within the transport hub,
wherein said transporting devices comprise elevators, escalators, moving walkways and trams, and
wherein the transport hub comprises an airport transport hub, a railway transport hub and a bus terminal transport hub, and wherein the departure vehicle comprises an automobile, a train, an airplane, a bus and a motorized vehicle.

16. A system, comprising a computing device, said computing device comprising one or more processors, one or more memories, and one or more computer readable hardware storage devices, said one or more hardware storage devices containing program code executable by the one or more processors via the one or more memories to implement a method to assist a person traveling through a transport hub, method comprising:

providing access, by a plurality of portable smart computing devices, to personal data for members of a group of people traveling together through the transport hub for a trip, wherein each person of the group has possession of a single portable computing device of the plurality of portable computing devices;

mapping, by each person's portable smart computing device, a preferred route from a current location at which the group is located for each person to travel through the transport hub, wherein the preferred route is a direct route without stops or a route including one or more preferred stops;

selecting from the mapped preferred routes, by the plurality of portable computing devices, a group route which is route to be commonly used by each person of the group, wherein the selected group route is the mapped preferred route of one portable computing device of the plurality of portable computing devices, wherein each person's portable computing device mapped a preferred route for each previous trip of a plurality of previous trips by the group, and wherein said selecting the one portable computing device is based on the preferred route for the one portable computing device have been a group route for more of the previous trips than was the preferred route for any other portable computing device of the plurality of portable computing devices;

generating, by each person's portable smart computing device, sub-groups of members to travel through the transport hub together in response to matching personal data;

monitoring, by each person's portable smart computing device, the personal data for members of the group, travel data for the group, and transport hub data corresponding to the transport hub, wherein the travel data for the group includes a departure location, a boarding time, and a departure vehicle; and alerting each person, by each person's portable smart computing device, in response to the monitored values, to begin moving from the current location towards the departure location along the selected group route to arrive at the departure location at a desired arrival time.

17. The system of claim 16, wherein the personal data includes data independently selected, for each person, from the group consisting of the person's health, the person's lifting ability, the person's ability to pull or carry luggage, the person's endurance, the person's ability to walk through the transport hub, and combinations thereof.

18. The system of claim 16, wherein the transport hub data includes of maps or layout data of the transport hub.

19. The system of claim 16, wherein the monitored values include predetermined parameters, and wherein the predetermined parameters comprise:
a distance from the current location to the departure location;
an estimated travel speed of each person of each sub-group to travel from the current location to the departure location; and
an estimated travel time of each person of each sub-group upon leaving the current location to arrive at the departure location at the desired arrival time.

20. The system of claim 16, wherein the transport hub data includes the transport hub layout; locations of departure vehicles, and locations of transporting devices within the transport hub,
wherein said transporting devices comprise elevators, escalators, moving walkways and trams, and
wherein the transport hub comprises an airport transport hub, a railway transport hub and a bus terminal transport hub, and wherein the departure vehicle comprises an automobile, a train, an airplane, a bus and a motorized vehicle.

* * * * *